(12) United States Patent
Bestfleisch

(10) Patent No.: US 11,256,501 B2
(45) Date of Patent: Feb. 22, 2022

(54) FEDERATED EXTENSIBILITY WORKBENCH

(71) Applicant: SAP SE, Walldorf (DE)

(72) Inventor: Ulrich Bestfleisch, Schwetzingen (DE)

(73) Assignee: SAP SE, Walldorf (DE)

( * ) Notice: Subject to any disclaimer, the term of this patent is extended or adjusted under 35 U.S.C. 154(b) by 7 days.

(21) Appl. No.: 16/385,375

(22) Filed: Apr. 16, 2019

(65) Prior Publication Data

US 2020/0334034 A1 Oct. 22, 2020

(51) Int. Cl.
  *G06F 9/44* (2018.01)
  *G06F 8/71* (2018.01)
  *G06F 9/54* (2006.01)
  *G06F 8/658* (2018.01)
  *G06F 8/76* (2018.01)

(52) U.S. Cl.
  CPC ............... *G06F 8/71* (2013.01); *G06F 8/658* (2018.02); *G06F 8/76* (2013.01); *G06F 9/541* (2013.01); *G06F 9/547* (2013.01)

(58) Field of Classification Search
  CPC ... G06F 8/71; G06F 8/658; G06F 8/76; G06F 9/541; G06F 9/547
  See application file for complete search history.

(56) References Cited

U.S. PATENT DOCUMENTS

| | | | |
|---|---|---|---|
| 2005/0138151 A1* | 6/2005 | Lam | G06F 9/44505 709/220 |
| 2005/0203975 A1* | 9/2005 | Jindal | G06F 8/38 |
| 2011/0173294 A1* | 7/2011 | Jackson | G06F 16/27 709/217 |
| 2012/0216179 A1* | 8/2012 | Sharma | G06F 8/65 717/168 |
| 2012/0291021 A1* | 11/2012 | Banerjee | G06F 8/654 717/173 |
| 2013/0275958 A1* | 10/2013 | Ivanov | G06F 8/61 717/174 |
| 2015/0178050 A1* | 6/2015 | Said | G06F 8/30 717/106 |
| 2016/0054992 A1* | 2/2016 | Berg | G06F 9/44505 717/169 |

* cited by examiner

*Primary Examiner* — Wei Y Zhen
*Assistant Examiner* — Amir Soltanzadeh
(74) *Attorney, Agent, or Firm* — Buckley, Maschoff & Talwalkar LLC

(57) ABSTRACT

Provided is a system and method for providing a single entry point for integrating software extensions across different software application. In one example, the method may include receiving, via a unified extensibility entry point, an indication that a first software artifact of a first software application is being locally extended, identifying one or more other software artifacts in one or more other software applications that are capable of being cross-extended based on the local extension of the first software artifact in the first software application, and displaying, via a user interface, information about the one or more other software artifacts that are capable of being cross-extended.

21 Claims, 7 Drawing Sheets

FEDERATED EXTENSIBILITY WORKBENCH

BACKGROUND

Software extensibility provides a mechanism for customers to extend a cloud-based solution with a strict contract between the cloud system being extended and the customer's extensions such that the underlying cloud system can be upgraded without breaking the extensions. An example of extensibility is field extensibility in which a data field within a data structure such as a table, a business object, or the like, is modified in some way. Software is often an evolving entity which is developed and maintained over time by developers, yielding ongoing changes in specification and implementation. When a customer purchases a group of software application from a single vendor, they expect a seamlessly integrated homogenous suite of applications. This expectation also holds true for extensibility capabilities.

However, modern applications (e.g., cloud applications, etc.) face challenges in managing highly distributed heterogenous environments and underlying data. In particular, customers may interact with a cloud vendor (or multiple vendors) which provides access to multiple cloud applications running on different technology stacks. Although created by different vendors, the cloud applications can still be dependent on one another, e.g. when a business process flow is touching both applications. In such a case, when one application is locally extended, the other (dependent) applications must be separately and manually extended to integrate such changes across the independent applications. Therefore, what is needed is an improved mechanism for extensibility in today's cloud computing environment.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
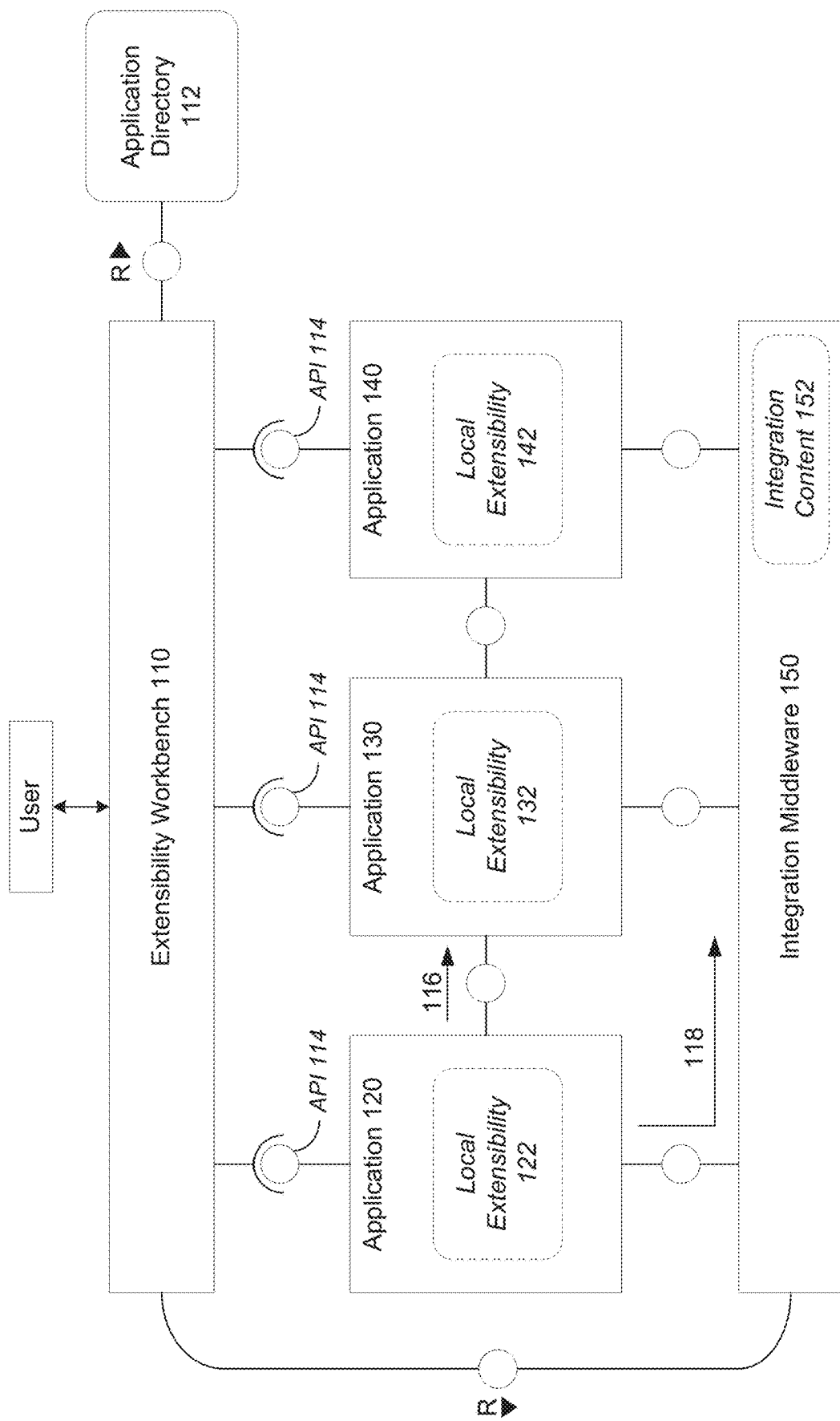
FIG. 1 is a diagram illustrating a computing architecture that supports an extensibility workbench in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Software applications can be extensible in that each application may allow customization of data fields (tables) that may be included within a business object, a database table, or the like. For example, an application may be extended by adding or modifying a field within a database table, adding a new table, adding or modifying a business object, and the like. In a cloud computing environment, independently developed software applications on different technology stacks are made accessible to a single user (customer). Here, the different applications may be developed by different vendors using different programming languages, runtime environments, etc. In this case, the different applications may have inter-dependencies therebetween. For example, an output of a data object, data table, service, etc., in a first application may be an input to a data object, data table, service, etc. in a second application. Therefore, an extension in one software application may need to be propagated in other software applications.

However, extending the software applications that require different semantics and tools has typically been performed manually. Such a process requires an expert user to understand the different tools/semantics in order to integrate extensions from one software application to another. Not only is this process time-consuming, it is also prone to errors and requires the user to have knowledge of multiple different tools.

The example embodiments are directed to a federated cloud extensibility workbench which overcomes the drawback of the prior art by providing a single point of entry that is configured to orchestrate and integrate an extension of one software application across other software applications which are dependent therefrom. The workbench may be hosted within a cloud computing environment and accessible to a user/developer who has access to multiple independently developed software applications. The workbench may provide a unique application programming interface (API) that can retrieve metadata from a plurality of independent software applications which can be used to identify extension dependencies between the applications. Therefore, when a user makes a change (extension) in a first application, the workbench can identify other applications where such changes can be cross-extended.

As a non-limiting example, a first software application may be directed to capturing leads for generating new business while a second software application may be directed to handling sales opportunities that are created from the captured leads. Here, data created by the leads application may be input and handled by the sales opportunity application. In this case, a change to a field in the table data in leads may need to be integrated into the table data of sales opportunities. The workbench can identify such cross-application dependencies and also provide a mechanism by which a user can browse and select which cross-application dependencies which are also to be extended. Furthermore, the workbench can also provide a mechanism by which such extensions can be activated.

FIG. 1 illustrates a computing architecture 100 that supports an extensibility system in accordance with an example embodiment. Referring to FIG. 1, the architecture 100 includes a plurality of software applications 120, 130, and 140 which are accessible to a single user. In this example, each of the applications 120, 130, and 140 is configured with functionality to perform local extensibility 122, 132, and 142, respectively. Each software application 120, 130, and 140, may include its own respective software artifacts such as database tables, business objects, services/logic, views (UI), and the like. A cloud integration middleware 150 may allow applications to communicate with one another and may store mappings from one application to another.

According to various embodiments, an extension to a software artifact in a first application among the applications 120, 130, and 140, may be integrated/extended to a software artifact in a second application. For example, an extensibility workbench 110 can provide a single point of entry that is configured to orchestrate and integrate an extension of one software application across other software applications based on dependencies which are stored in an application directory 112. For example, when a user logs into the system, the application directory 112 may provide a directory of all the applications 120, 130, 140, etc., that are running/associated with the user. In this way, the workbench 110 creates a single entry point for the users to extend all their subscribed applications 120, 130, 140, etc. The cloud application directory that is connected to the cloud extensibility workbench is aware of all cloud applications they key user's company is entitled to use.

In the example of FIG. 1, the extensibility workbench 110 provides an application programming interface (API) 114. Each software application 120, 130, 140, etc., may provide its local extensibility features to the workbench 110 through the API 114. The extensibility features may include various software artifacts that can be extended within the applications such as services, tables, business objects, analytics, user interfaces, integration interfaces, etc. The extensibility capabilities are exposed to the extensibility workbench 110 through the API 114.

According to various embodiments, the API 114 may include operations for performing various functionality such as detecting the type of available artefacts and their extensibility capabilities. Using these APIs 114, the extensibility workbench 110 provides the user with the possibility to extend each individual application with a single, federated access point, in an integrated user experience. Each individual cloud application 120, 130, and 140 provides local extensibility features 122, 132, and 142, respectively, which allows extending various artifacts, for example, services, tables, business objects, analytics, user interfaces, integration interfaces, and the like. These extensibility capabilities are exposed towards the cloud extensibility workbench 110 through the API 114. For example, the API 114 may include the following operations:

Detecting the type of available artifacts and their extensibility capabilities

Browsing the available artifacts, their extensions, and their dependencies

Activating extensibility features such as field extensions for certain artifacts Determining active cross-application integration scenarios In this example, a software artifact in the software application 120 may be locally extended by the user based on a local extensibility 122. Here, the extensibility workbench 110 may integrate such local extensions to the software artifact of application 120 to one or more of the other software applications 130 and 140 based on dependencies detected through the API 114 and stored within the application directory 112. For example, the extension may be propagated from the application 120 to an artifact in the application 130. The extensibility workbench 110 provides multiple paths for extension integration. In particular, a point-to-point integration 116 may be performed between an outbound interface of the extended artifact in application 120 to an inbound interface of a dependent artifact in application 130. As another example, an integration 118 may be mediated through the cloud integration middleware 150. In this case, integration content 152 may be propagated/flow through the cloud integration middleware 150 into one or more other applications 130 and 140.

By propagating the extension from the first application into a second application through the extensibility workbench 110, the user does not need to make separate changes within different applications nor understand the semantics/tools needed to make such extensions. The extensibility workbench 110 is a federation that provides harmonized access to local extensibility features of different applications 120, 130, and 140. The extensibility workbench 110 orchestrates the extensions and acquires an understanding of dependencies based on the API 114 to allow key users to have a harmonized experience when extending a suite of applications.

Figure 2:
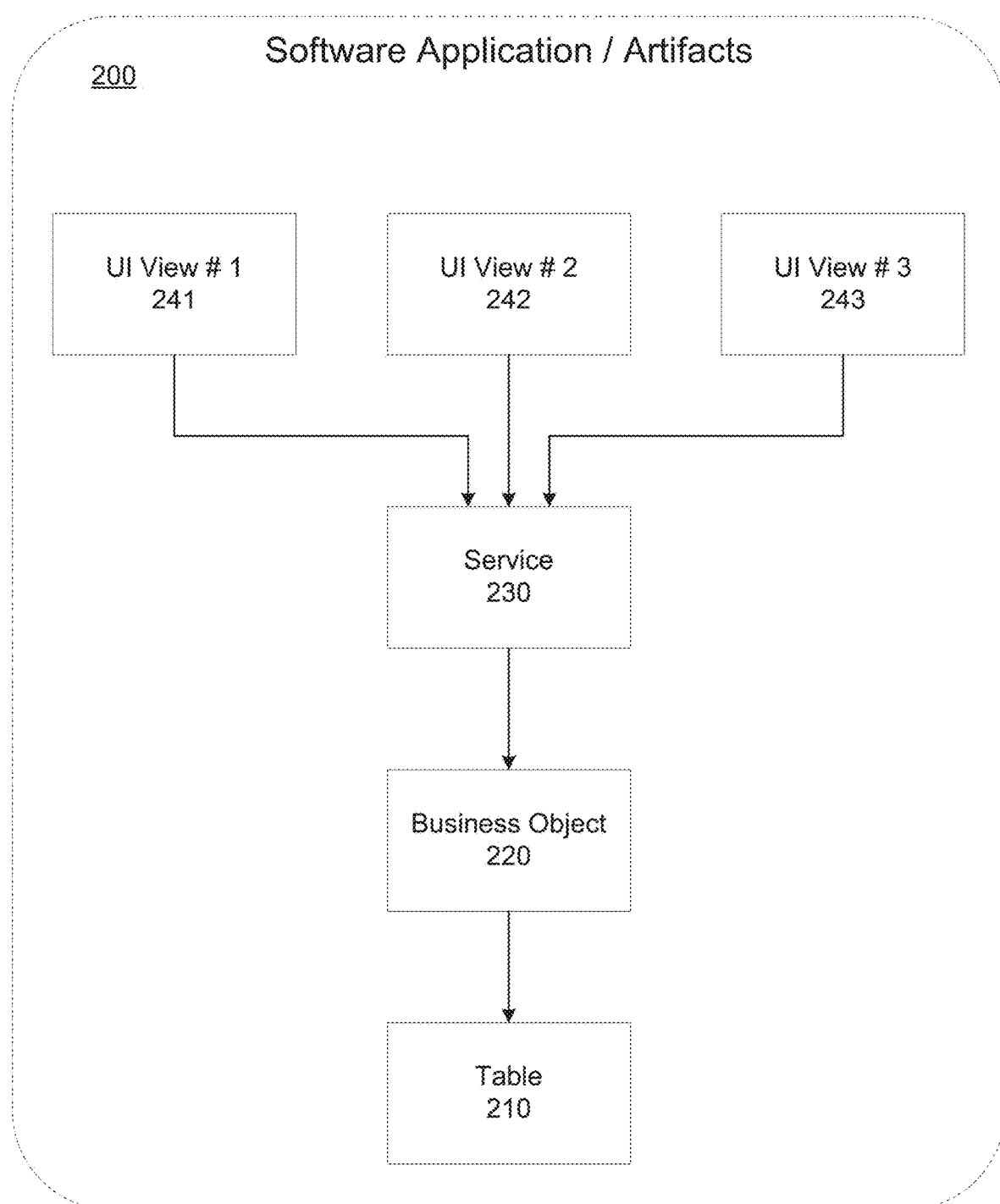
FIG. 2 is a diagram illustrating software artifacts of a software application in accordance with an example embodiment.

FIG. 2 illustrates software artifacts of a software application 200 in accordance with an example embodiment. Referring to FIG. 2, the software application 200 includes various software artifacts including a table 210, a business object 220, a service 230, and a plurality of user interface views 241, 242, and 243. The table 210 may include database tables (columns, rows, etc.) with various fields of data. The table 210 may include values that are stored within the fields. The business object 220 may create a view of the table data. For example, the business object 220 may include hierarchical database tables created from the underlying table data. The business object 200 also allows a user other possibilities like creating a custom maintenance UI, an open data protocol (OData) service to maintain values from outside a cloud environment, and the like.

The business object 220 may include a name, a set of fields, attributes, and the like. The business object 220 may also include logic for maintenance, views, service generation, and the like. A user may customize/extend fields from a business object 220 and/or a table 210 to thereby create an extension.

Examples of extensions include additions to fields of data, hiding of fields of data, modifying fields of data, and the like. These examples include creating new fields such as fields for a specific business context. Other extensions include a change/modification to a field such as a change in a field type, making a field available in other languages, and the like. In some cases, usage of a field may be enabled by making fields available for UIs, reports, email templates, form templates, business scenarios, etc., and making content of the field searchable within free-text search. Fields may be published and already published fields may be edited. Furthermore, changes to a field may be discarded and thus reset all modifications to get back to the state of the last published version of a field with one click.

Other examples of extensions include create your own business objects and the corresponding database tables, adding fields to business objects, generate UIs based on custom business objects, publishing business objects, editing business objects that have already been published, create multiple sub nodes for one business object, resetting business objects to their last published version, deleting fields and business objects that have not yet been transported to a production system, and the like.

Figure 3A:
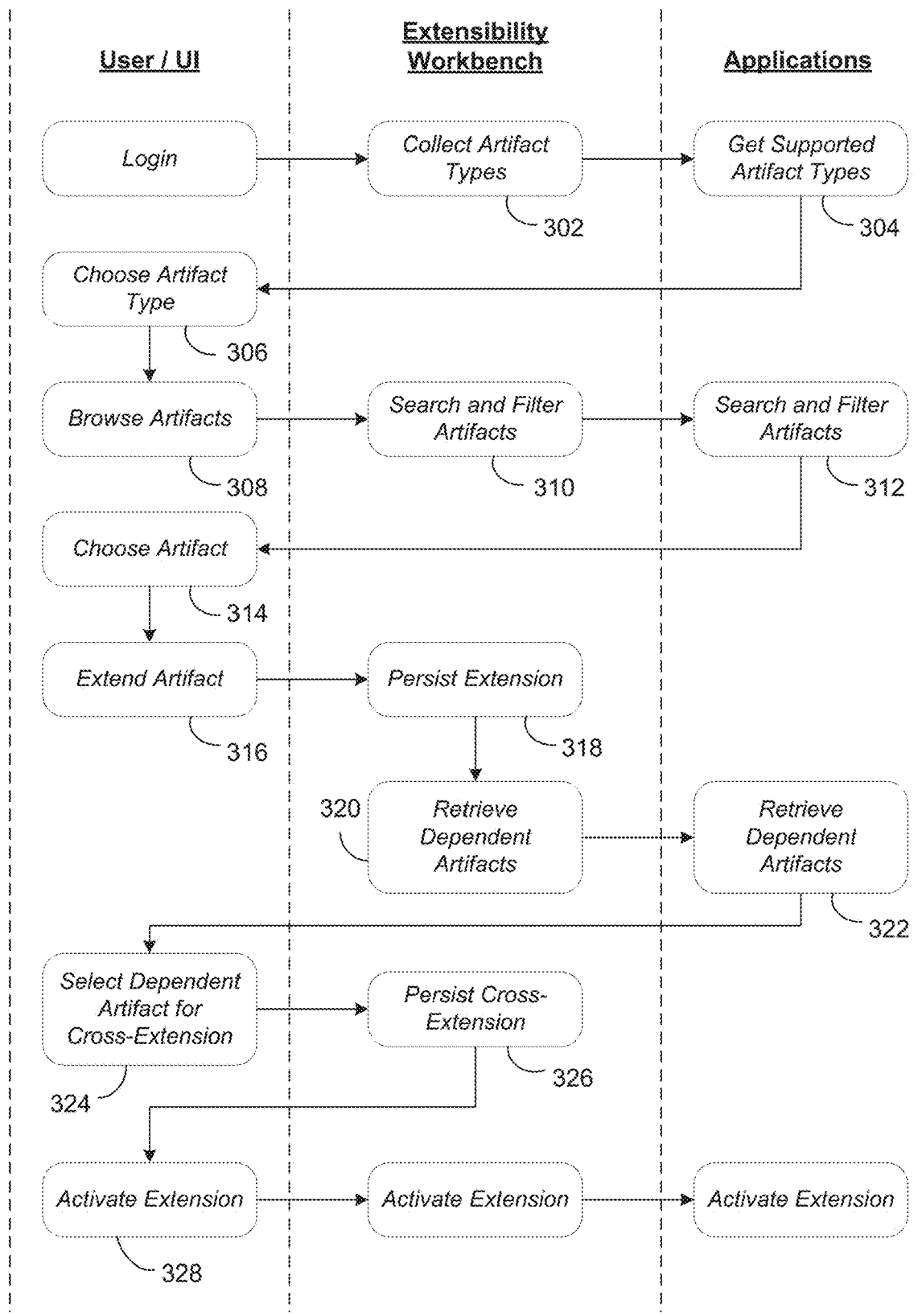
FIG. 3A is a diagram illustrating a process of performing a cross-application extensions via a single point of entry in accordance with an example embodiment.
Figure 3B:
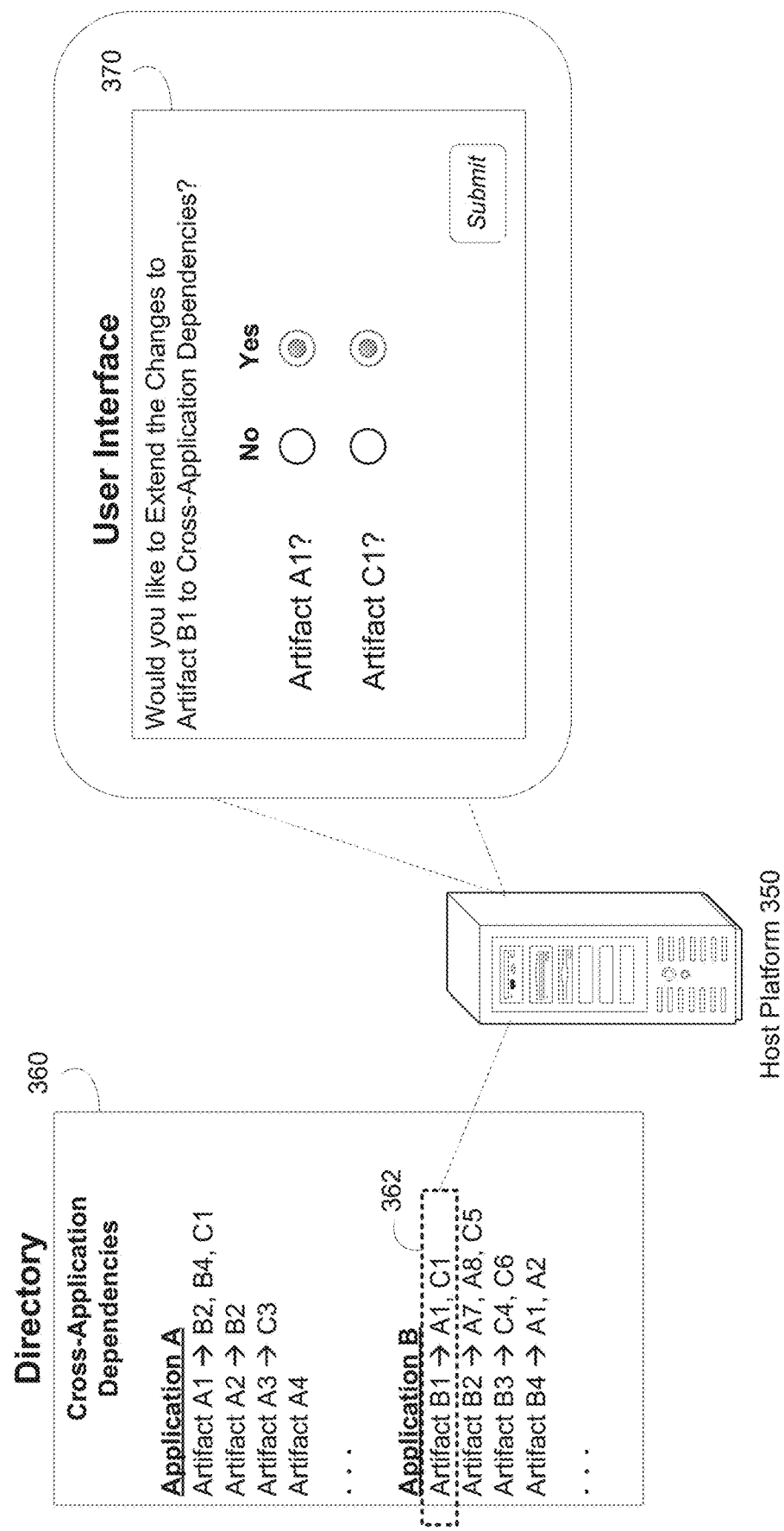
FIG. 3B is a diagram illustrating a user interface displaying cross-application extensibility choices in accordance with an example embodiment.

FIG. 3A illustrates a process 300A of performing a cross-application extensions via a single point of entry in accordance with an example embodiment, and FIG. 3B illustrates a process 300B of displaying a user interface 370 of cross-application extensibility choices in accordance with an example embodiment. Referring to FIG. 3A, a user interacts with an extensibility workbench and a plurality of applications which may be hosted on a platform such as a cloud computing environment, a web server, or the like. The user may connect to the extensibility workbench m via a user device such as a mobile device, a desktop computer, a database, a server, or the like, which accesses the cloud platform through a network such as the Internet, a private network, or the like. The workbench may output a user interface which allows the user to manipulate extensions to the applications.

In this example, the user may login to the extensibility workbench. In response, in 302 the workbench may identify applications that are associated with the user (e.g., that a customer has access to, etc.) and in 304 retrieve the software artifacts from the accessible applications. In 306, the user may receive a listing of the types of artifacts that are capable of being extended and may choose a type. In response, in 308 the user may browse a list of software artifacts in the selected artifact type to search for a desired software artifact to be modified. As the user browses through the list of software, the extensibility workbench searches and filters the artifacts along with the applications in 312. In response, the user interface displayed to the user may change/populate with different software artifacts and information about the artifacts such as possible cross-extensions, etc., which is collected by an API of the extensibility workbench.

In 314, the user selects a first software artifact to extend within a first software application. The user may then create the extension, in 316, locally by modifying the first software artifact, for example, by modifying a business object, a table, a service, a view, etc., with one or more of a custom data field, or the like. In 318, the extensibility workbench may persist information about the extension to the first software artifact, and in 320, the workbench may call the other applications associated with the user and in 322 may retrieve other dependent software artifacts across the different applications that depend on the first software application that has been extended. Here, the other software artifacts may be business objects, tables, services, views, or the like, which are included in other software applications and which depend from the first software artifact.

A list of the other software artifacts may be displayed via a user interface, such as shown in the example of FIG. 3B. In this example, the extensibility workbench and the applications are hosted by a host platform 350. Here, the host platform 350 stores a directory 360 with information about cross-extension capabilities among the artifacts in the different software applications. In this example, it is assumed that a user has chosen to extend software artifact B1 from software application B. In response, the host platform 350 can retrieve other dependent software artifacts from different applications and identify which cross-application dependencies exist for the extended software artifact B1. In this case, software artifact A1 from software application A and software artifact C1 from software application C can both be cross-extended. In other words, the changes made to software artifact B1 can be propagated/integrated into software artifact A1 in application A and software artifact C1 in application C. In this case, the host platform 350 outputs a user interface 370 that provides the user with the ability to easily select which other cross-application dependencies to also extend.

Referring again to FIG. 3A, in 326 the extensibility workbench may persist the cross-extensions selected by the user. Furthermore, in 328 the user can be provided with an activation button or option within the user interface from the extensibility workbench. When the user selects to activate the cross-extension in 328, the cross-extension is integrated by the extensibility workbench into the other software artifacts chosen in 324.

Figure 4:
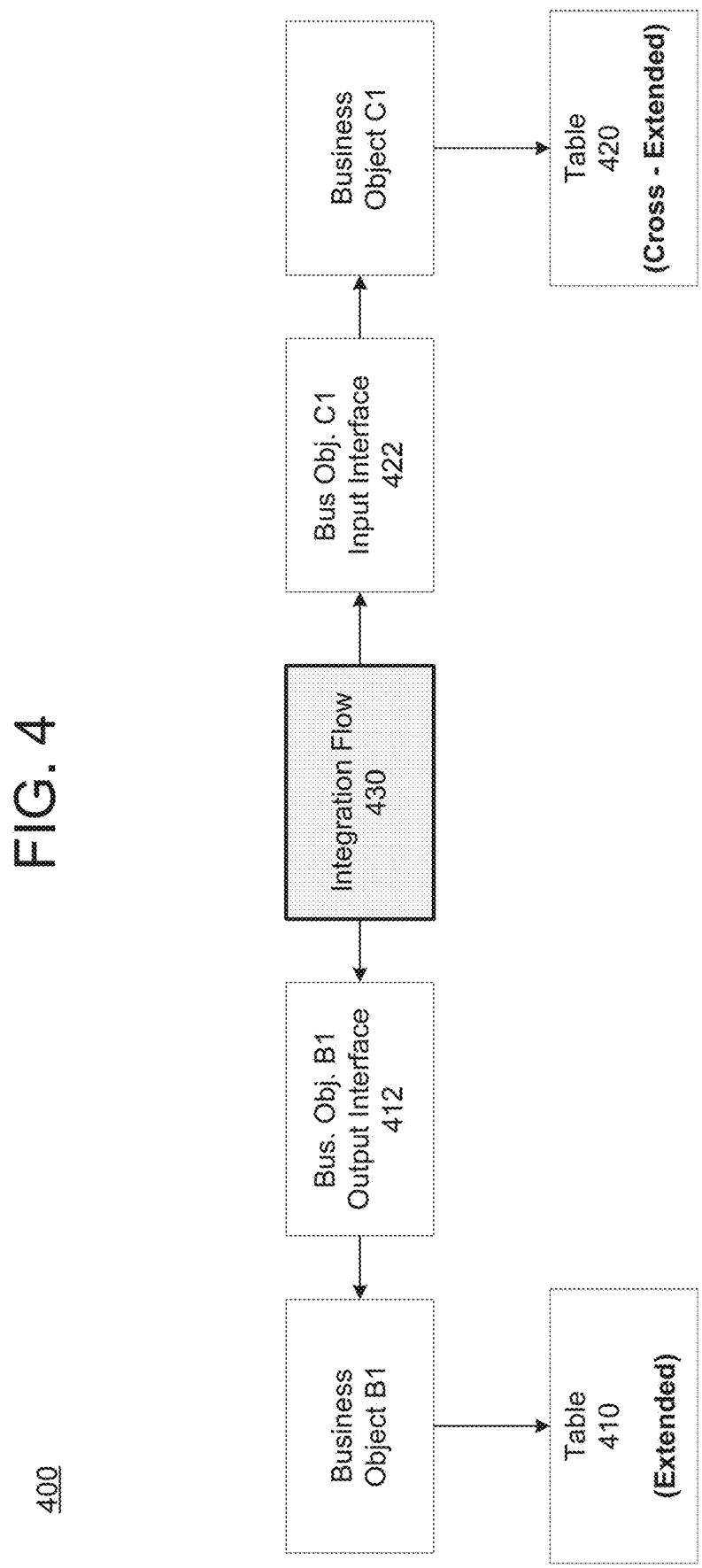
FIG. 4 is a diagram illustrating a process of propagating an extension to an artifact in a first application to an artifact in a second application in accordance with an example embodiment.

FIG. 4 illustrates a process 400 of propagating an extension of a first artifact 410 in a first application to a second artifact 420 in a second application in accordance with an example embodiment. In this example, a user has chosen to add a new field to a table thereby creating an extension to the table. The extended table is referred to as the first artifact 410. The extensibility workbench (not shown) may detect an active integration scenario between the extended artifact 410 and the second artifact 420 based on metadata of extension capabilities which are determined through the API of the extensibility workbench.

In addition to providing one entry point for extensibility, the cloud extensibility workbench is aware of active integration scenarios. Based on information from the cloud application directory, each individual cloud application, and the central cloud integration, the workbench enables the following scenarios:

For each field extension the cloud extensibility workbench determines the outbound interfaces that might be affected and asks the user whether that field extension should be propagated to other connected applications as well.

The user can choose which inbound interfaces and underlying services and entities should be extended.

Depending on the type of integration the cloud extensibility workbench chooses the right strategy:

If it is a point-to-point integration, extending the outbound and inbound interfaces is sufficient.

If integration is mediated with the cloud integration middleware, the integration content that is active for the affected applications is extended as well, such the extended data flows through the cloud integration middleware.

Referring again to FIG. 4, a message-based outbound interface 412 of the first business object associated with the extended table 410 is connected to an inbound creation interface 422 a business object associated with the cross-extendable table 420 via an integration flow definition that may be executed by a cloud integration middleware (e.g., cloud integration middleware 150 shown in FIG. 1). If the user is extending the table 410 he can choose to extend the outbound interface 412 of a business object storing the table, the integration flow and the opportunity creation inbound interface 422 of the second table 420. Extending the inbound interface 412 results in extending the business object and the corresponding persistent table 412, otherwise the data could not be persisted. During activation of these cross-application extensions, the extensions may be activated in the reverse order of their dependencies.

Accordingly, the extensibility workbench provides a single entry point (one user experience) and a normalized view on metadata (where sometimes there is a different name for things—tables, objects, services, different behaviors, etc.). The end user has a user interface, and a single point where the user can activate and orchestrate the extensions. Extensibility data may be collected in a central place and the knowledge about the dependencies and can be leveraged together. The knowledge here is that the extensibility workbench knows how the content is connected and then uses this knowledge to create a harmonized extensibility experience. Prior to this, the user would need to manually extend each application separately and hope that it fits together.

Figure 5:
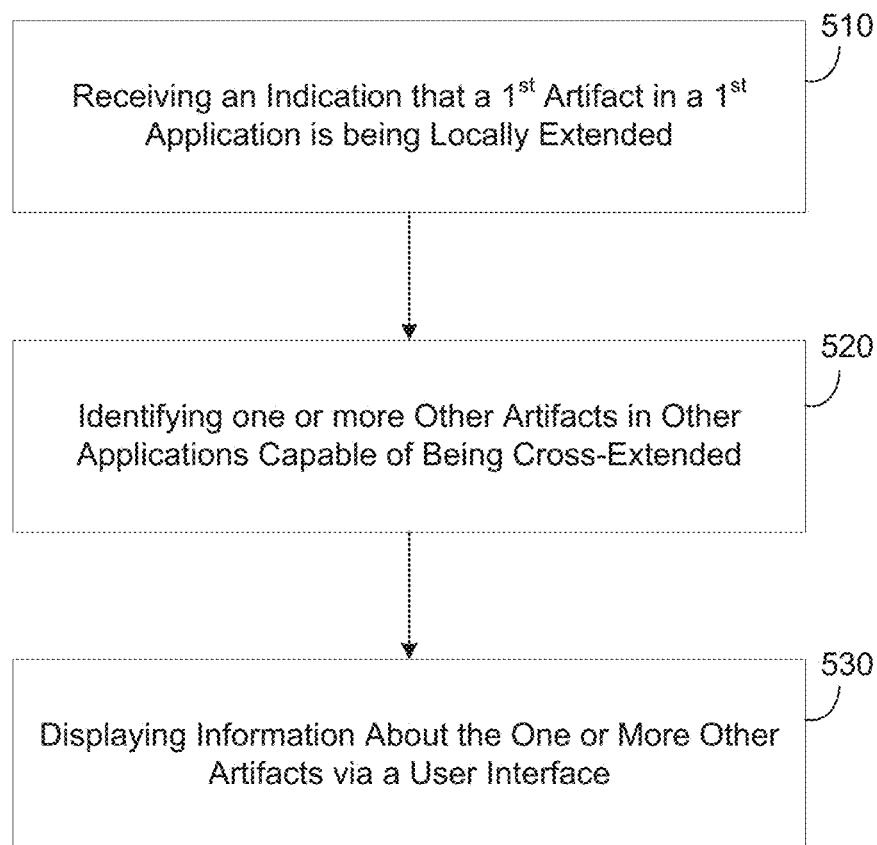
FIG. 5 is a diagram illustrating a method of identifying cross-application extension choices in accordance with an example embodiment.

FIG. 5 illustrates a method 500 of identifying cross-application extension choices in accordance with an example embodiment. For example, the method 500 may be performed by a database node, a cloud platform, a server, a computing system (user device), a combination of devices/nodes, or the like. Referring to FIG. 5, in 510, the method may include receiving, via a unified extensibility entry point, an indication that a first software artifact of a first software application is being locally extended. Here, the unified extensible entry point may create a single point of entry for extending multiple independent (stand-alone) software applications such as cloud applications developed by different development vendors. The unified extensible entry point may include a dedicated API that retrieves metadata identifying cross-extension dependencies between software artifacts of the plurality of software applications and a directory storage for storing information about the cross-extension dependencies. The software artifact that is being extended may be a business object (table), a service, a view, or the like. The extension may include a change or addition, to a data field.

In 520, the method may include identifying one or more other software artifacts in one or more other software applications that are capable of being cross-extended based on the local extension of the first software artifact in the first software application. For example, the identifying is performed based on application dependencies stored in a directory, and the application dependencies identify dependencies between software artifacts of the first software application and software artifacts of the one or more other software applications. In 530, the method may further include displaying, via a user interface, information about the one or more other software artifacts that are capable of being cross-extended.

The unified extensible entry point may also enable an extension created in a first software application to be propagated or otherwise integrated within one or more other applications. For example, in some embodiments, the method may further include detecting a selection, via the user interface, to cross-extend a second software artifact from a second software application from among the one or more other software applications that is dependent on the first software artifact of the first software application. In some embodiments, the method may include creating an integration between an outbound interface of the first software artifact in the first software application and an inbound interface of the second software artifact in the second software application to cross-extend the second software artifact based on the first software artifact being locally extended, in response to the selection being received.

In some embodiments, the displaying may include displaying a browsable list of other software artifacts capable in other software applications that are dependent on the first software artifact that is being locally extended and that are capable of being cross-extended based on the first software artifact being locally extended. Here, the user of the user interface may traverse the list to identify which software artifacts/application combinations for integrating an extension.

Figure 6:
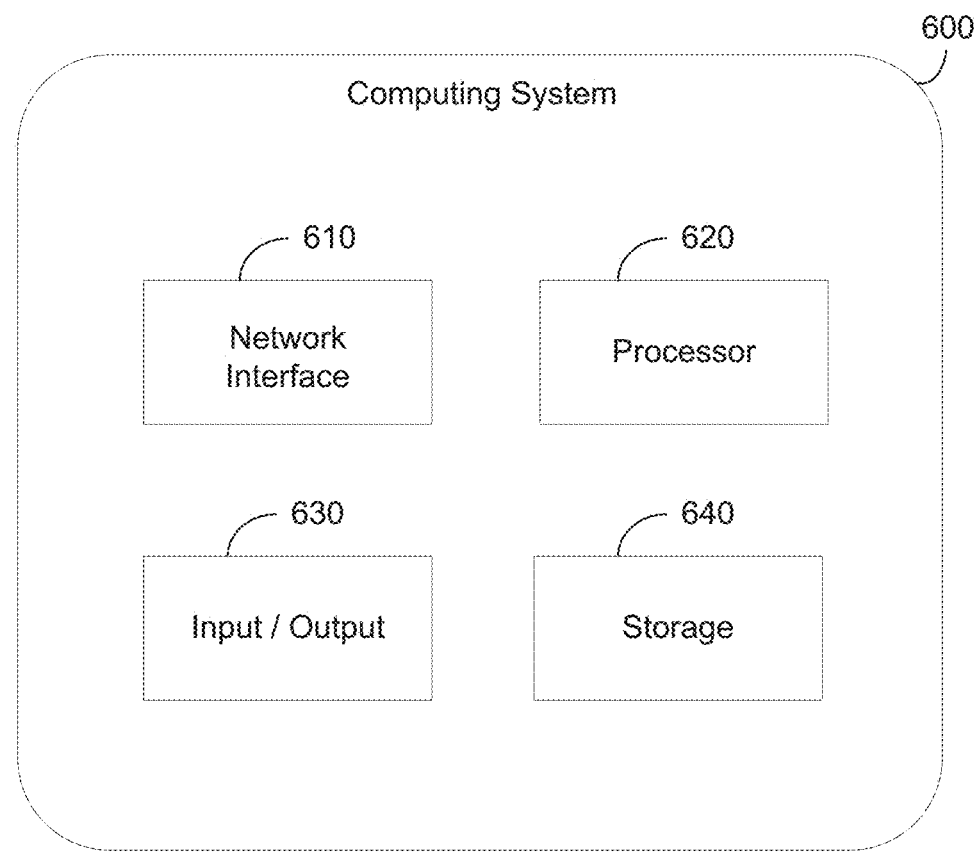
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600. I The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. As another example, the output 630 may output content to an embedded display of the computing system 600, an externally connected display, a display connected to the cloud, another device, and the like. As another example, the output 630 may output data via a network, or the like. In some embodiments, the output 630 may be performed by the processor 620 and/or the network interface 610. In addition, the network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, partitions and sub-partitions. The storage 640 may be used to store database records, items, entries, and the like.

According to various embodiments, the processor 620 may implement a unified extensibility entry point including an application programming interface which retrieves metadata including extensibility information of a plurality of software applications. The extensibility information may be stored within an application directory implemented within the storage 640. In an embodiment, the processor 620 may receive an indication that a first software artifact of a first software application is being locally extended, and identify one or more other software artifacts in one or more other software applications that are capable of being cross-extended based on the local extension of the first software artifact in the first software application. In response, the output 630 may output, via a user interface, information about the one or more other software artifacts that are capable of being cross-extended. For example, the output 630 may output a browsable list of software artifacts that are dependent from the first software artifact being extended. Here, the locally extending of the first software artifact may include modifying at least one of a data table and a business object of the first software artifact.

According to various embodiments, the processor 620 may identify the one or more software artifacts associated with the first software artifact based on application dependencies stored in the application directory in the storage 640. For example, the application dependencies may identify dependencies between software artifacts of the first software application and software artifacts of the one or more other software applications, and may be retrieved from the metadata of the plurality of software applications via the dedicated API.

In some embodiments, the processor 620 may detect a selection, via the user interface, to cross-extend a second software artifact from a second software application from among the one or more other software applications that is dependent on the first software artifact of the first software application. In some embodiments, the processor 620 may create an integration between an outbound interface of the first software artifact in the first software application and an inbound interface of the second software artifact in the second software application to cross-extend the second software artifact based on the first software artifact being locally extended, in response to the selection being received. Here, the integration between software artifacts may be an integration between two or more database tables, two or more business objects, two or more software services, two or more user interface views, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system, comprising:
    a processor configured to
        connect, via a workbench on a host platform, to a plurality of independently developed software applications hosted on and executing on the host platform via an application programming interface (API),
        retrieve, by the workbench via the API, cross-dependency information between data objects of the plurality of independently developed software applications,
        receive, via the workbench, a selection to modify a data object of a first software application with an extension that includes one or more of an addition of a new field of data values to a first database table of the first software application and a modification to an existing field of data values of the first database table, and
        identify, via the workbench, a second software application independently developed from the first software application which comprises a second database table that receives an input from an output of the first database table of the first software application based on the cross-dependency information,
        receive a selection to propagate the extension to the second software application, and
        activate the extension in the second database table of the second software application and then activate the extension in the first database table of the first software application in a reverse order of cross-dependency.

2. The computing system of claim 1, wherein the extension comprises adding the new field of data values to the first database table, and the activating comprises adding the new field of data values to the second database table which enables data output from the new field of the first database table to be received by the new field of the second database table.

3. The computing system of claim 1, wherein the processor is configured to identify an interdependency between an input of an existing data object of the second software application and an output of the data object of the first software application based on mapped application interdependencies that are stored in a directory of the workbench.

4. The computing system of claim 1, wherein the processor is further configured to retrieve cross-extension dependencies between the first software application and one or more other software applications via the API.

5. The computing system of claim 1, wherein the processor is further configured to detect a selection, via a user interface, to activate the extension of the first software application in the second software application.

6. The computing system of claim 1, wherein the processor is further configured to create a direct integration between an outbound interface of the first software application and an inbound interface of the second software application to cross-extend the second software application.

7. The computing system of claim 1, wherein the data object of the first software application comprises at least one of a business object, a software service, and a user interface view.

8. The computing system of claim 1, wherein the processor is configured to display a browsable list of a plurality of software artifacts in other software applications that are dependent on the data object of the first software application that is being locally extended and that are capable of being cross-extended based on the cross-dependency information.

9. A method comprising:
connecting, via a workbench on a host platform, to a plurality of independently developed software applications hosted on and executing on the host platform via an application programming interface (API);
retrieving, by the workbench via the API, cross-dependency information between data objects of the plurality of independently developed software applications;
receiving, via the workbench, a selection to modify a data object of a first software application with an extension that includes one or more of an addition of a new field of data values to a first database table of the first software application and a modification to an existing field of data values of the first database table;
identifying, via the workbench, a second software application independently developed from the first software application which comprises a second database table that receives an input from an output of the first database table of the first software application based on the cross-dependency information;
receiving a selection to propagate the extension to the second software application; and
activating the extension in the second database table of the second software application and then activate the extension in the first database table of the first software application in a reverse order of cross-dependency.

10. The method of claim 9, wherein the extension comprises adding the new field of data values to the first database table, and the activating comprises adding the new field of data values to the second database table which enables data output from the new field of the first database table to be received by the new field of the second database table.

11. The method of claim 9, wherein the identifying comprises identifying an interdependency between an input of an existing data object of the second software application and an output of the data object of the first software application based on mapped application interdependencies that are stored in a directory.

12. The method of claim 9, further comprising retrieving cross-extension dependencies between the first software application and one or more other software applications via the API.

13. The method of claim 9, further comprising detecting a selection, via a user interface, to activate the extension of the first software application in the second software application.

14. The method of claim 9, further comprising creating a direct integration between an outbound interface of the first software application and an inbound interface of the second software application to cross-extend the second software application.

15. The method of claim 9, wherein the data object of the first software application comprises at least one of a business object, a software service, and a user interface view.

16. The method of claim 9, wherein the displaying comprises displaying a browsable list of a plurality of software artifacts in other software applications that are dependent on the data object of the first software application that is being locally extended and that are capable of being cross-extended based on the cross-dependency information.

17. A non-transitory computer-readable medium comprising instructions which when read by a processor cause a computer to perform a method comprising:
connecting, via a workbench on a host platform, to a plurality of independently developed software applications hosted on and executing on the host platform via an application programming interface (API);
retrieving, by the workbench via the API, cross-dependency information between data objects of the plurality of independently developed software applications;
receiving, via the workbench, a selection to modify a data object of a first software application with an extension that includes one or more of an addition of a new field of data values to a first database table of the first software application and a modification to an existing field of data values of the first database table;
identifying, via the workbench, a second software application independently developed from the first software application which comprises a second database table that receives an input from an output of the first database table of the first software application based on the cross-dependency information;
receiving a selection to propagate the extension to the second software application; and
activating the extension in the second database table of the second software application and then activate the extension in the first database table of the first software application in a reverse order of cross-dependency.

18. The non-transitory computer-readable medium of claim 17, wherein the identifying comprises identifying an interdependency between an input of an existing data object of the second software artifact and an output of the data object of the first software application based on mapped application interdependencies that are stored in a directory.

19. The non-transitory computer-readable medium of claim 17, wherein the method further comprises retrieving cross-extension dependencies between first software application and one or more other software applications via the API.

20. The non-transitory computer-readable medium of claim 17, wherein the method further comprises detecting a selection, via a user interface, to activate the extension of the first software application in the second software application.

21. The computing system of claim 1, wherein the processor is configured to indirectly integrate the extension of the first software application within the second software application via a middleware of the host platform.

\* \* \* \* \*